May 17, 1966  E. R. FISCHER ETAL  3,251,432

SELF-ADJUSTING AIR BEARING ASSEMBLY

Filed Sept. 5, 1963

INVENTORS
Earl R. Fischer &
Benjamin N. Snyder
BY
W. F. Wagner
ATTORNEY

United States Patent Office 3,251,432
Patented May 17, 1966

3,251,432
SELF-ADJUSTING AIR BEARING ASSEMBLY
Earl R. Fischer and Benjamin N. Snyder, Rochester, N.Y., assignors to General Motors Corporation, Detroit, Mich., a corporation of Delaware
Filed Sept. 5, 1963, Ser. No. 306,915
5 Claims. (Cl. 180—7)

This invention relates to air bearing devices and more particularly to air bearings of the type capable of elevating a supported load as well as maintaining the same in frictionless relation with the ground.

The present invention is primarily concerned with air bearing supported load carrying structures in which the load is supported and maintained in frictionless relation with the ground by low unit loading air bearing devices capable of producing significant variation in vertical displacement between the supported load and the ground, of which the device shown in co-assigned application Serial No. 4,465 is typical.

It is well known that devices of the type referred to above as well as other known types of air bearings require the establishment of a superatmospheric air cushion throughout an effective area under the load which is at least equal to the gross weight of the support structure and the load supported thereon. Naturally, in practical application, loads will vary widely, and it therefore follows that unregulated flow of air for such devices will on occasion be either excessive or insufficient, depending upon the load involved. While it is quite possible to energize such devices with a level of air flow and pressure calculated to support a predetermined maximum load, operation under reduced loading necessarily results in uneconomical operation, and in certain types of air bearings will tend to induce undesirable behavioral characteristics such as vertical oscillation.

An object of the present invention is to provide an improved air bearing support structure.

A further object is to provide a self-adjusting air bearing support.

Another object is to provide load carrying structure supported by low unit loading air bearing means incorporating load sensing means adapted to regulate the flow of air so as to maintain an optimum air flow rate for the load involved.

A still further object is to provide a structure of the type described incorporating altitude sensing air flow regulating means arranged to respond directly to variation in displacement between the supported structure and the ground.

Still another object is to provide an arrangement of the stated character wherein the sensing device is totally enclosed within the air bearing.

Yet a further object is to provide a valve for a device of the type described which is formed and arranged for rectilinear movement perpendicular to the plane of the supporting structure.

A still further object is to provide a valve of the stated character incorporating means for accomplishing precision modulation of air flow.

Still another object is to provide a valve of the type described which is simple in construction, low in cost and reliable in operation.

These and other objects, advantages and features of the invention will become more fully apparent as reference is had to the accompanying specification and drawing wherein.

Figure 1:
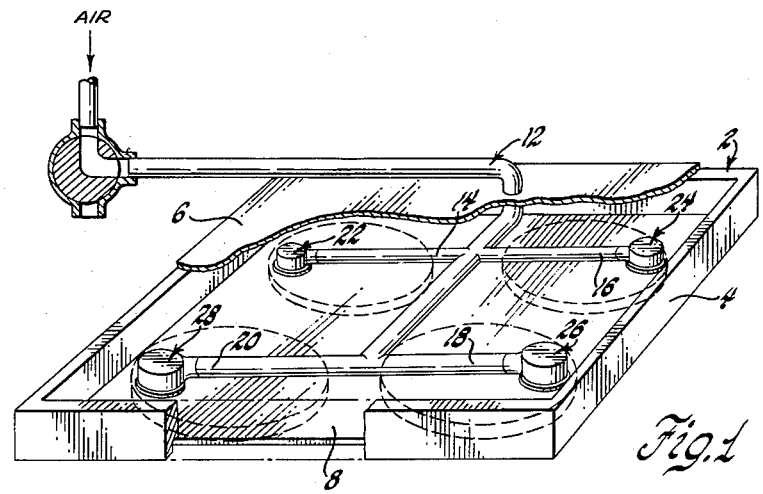
FIGURE 1 is a phantomized perspective view of a load supporting device incorporating the invention.
Figure 2:
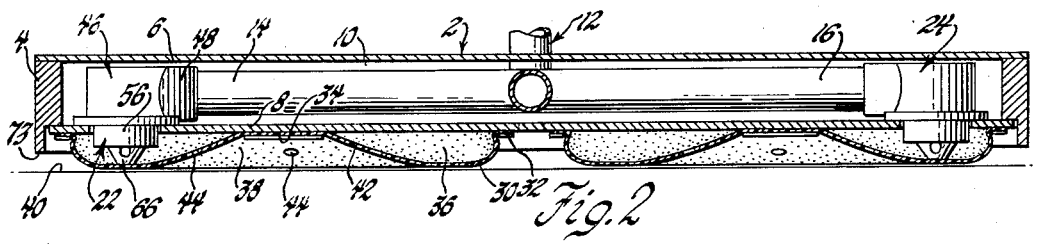
FIGURE 2 is a sectional elevational view of the device shown in FIGURE 1.

Referring now to the drawings and particularly FIGURES 1 and 2, there is shown an air bearing supported load carrying device in which the reference numeral 2 generally designates a load supporting framework or superstructure which includes a perimetrical depending side rail 4, an upper substantially rigid surface 6 and a lower substantially rigid surface 8, thereby forming a shallow box-like interior 10 in which is disposed a flexible conduit forming an air conducting network 12 connected in communicating relation with a source of pressurized air, not shown. In the illustrated embodiment, network 12 includes branch conduits 14, 16, 18 and 20 connected in parallel with air bearing assemblies 22, 24, 26 and 28 secured in horizontally spaced relation on the lower wall 8 of frame 2.

Since each air bearing assembly 22, 24, 26 and 28 corresponds in form, the following description of assembly 22 will be understood to apply to all. As seen best in FIGURE 2, bearing 22 includes a generally horizontally extending, flexible diaphragm 30 shaped to provide an annular relatively shallow depending convolution. The outer perimeter 32 and central portion 34 of diaphragm 30 are sealingly secured to wall 8 so that an annular chamber 36 is formed between the depending convolution and wall 8 which circumscribes a plenum cavity 38 formed between the ground 40 and wall 8. The intermediate central portion 42 of diaphragm 30 forms a generally conical wall portion which is provided at circumferentially spaced intervals with openings 44 allowing free communication between annular chamber 36 and plenum cavity 38.

Secured to and extending through wall 8 is a housing 46 having an inlet portion 48 connected in communicating relation with conduit 14. In accordance with the invention, housing 46 contains a valve assembly 49 which operates in a manner shortly to be described to regulate flow of air from conduit 14 into chambers 36 and cavity 38 at a rate which varies according to the imposed load on supporting framework 2.

Figure 3:
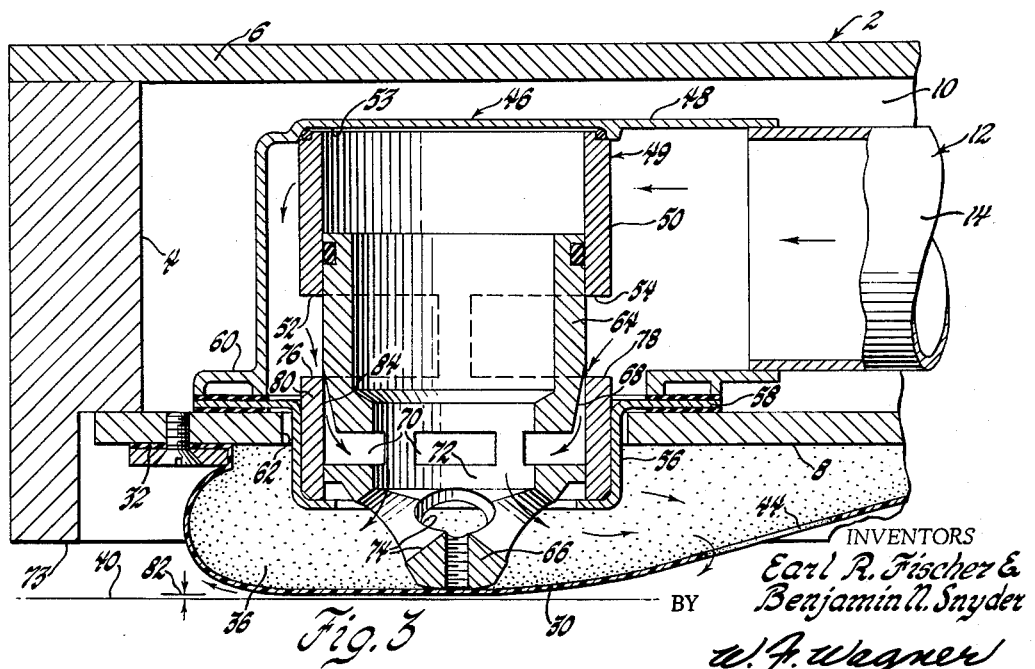
FIGURE 3 is a greatly enlarged fragmentary sectional elevation showing the details of construction of the invention.

As seen best in FIGURE 3, valve assembly 48 comprises a vertically extending sleeve element 50 having a pair of horizontally aligned slots 52 and 54 formed vertically midway thereof. The upper end of sleeve element 50 seats in a recess 53 in housing 46 while the lower end is caged in a cup member 56 having a radial flange portion 58 which is clamped between the flange portion 60 of housing 46 and the portion of wall 8 which immediately surrounds the opening 62 formed therein. Freely slidably disposed within sleeve element 50 is a hollow cylindrical valve member 64 having a probe portion 66 formed on the lower end thereof which lies in abutting engagement with the inner surface of diaphragm 30 in the area of the latter lying in closest proximity to the ground 40. Vertically intermediate thereof, cylindrical valve member 64 is provided with a progressively downwardly and inwardly tapering portion 68 immediately vertically upwardly adjacent to a plurality of circumferential slots 70. Slots 70 open into the hollow center 72 of valve member 64 which in turn communicates with apertures 74 formed in the probe portion to enable communication with annular chamber 36. Valve member 64 is preferably movable within sleeve 50 solely responsive to gravity, but may, if desired, be slightly biased to its downward extremity in the sleeve 50 as for example by a light compression spring or other well known elastic medium.

Operation of the device is as follows. When inoperative, the lower edge 73 of perimeter 4 of structure 2 rests on the ground and the diaphragm 30 is in a collapsed condition within the recess formed between wall 8 and the ground 40. Under these conditions, since probe 66 effectively abuts the ground, the valve 64 is elevated in sleeve 50 so that the tapered portion 68 is displaced to a position entirely above the lower edges 76 and 78 of slots 52 and 54. Communication is thus established between inlet 48 and slots 70 providing a flow path between annular cavity 36 and the source of air, not shown. Upon introduction of air from the indicated source, superatmospheric pressure is introduced into housing 46 through inlet 48 which passes through slots 52 and 54, slots 70, and apertures 74 into annular chamber 36, from which air is concurrently introduced through openings 44 into plenum cavity 38 thereby achieving elevation of the structure to its operating level.

Frictionless mobility of the structure occurs when the pressure in plenum cavity 38 exerts a force over its effective area equal to the portion of the load sensed by the individual air bearings 22, 24, 26 or 28. As the structure is elevated due to introduction of air, sleeve 50 is raised correspondingly relative to valve 64 which, as mentioned previously, is maintained in abutting engagement with diaphragm 30 by gravity. Accordingly, as the supported portion of the device reaches its design height or upwardly displaced level relative to the ground, the tapered portion 68 progressively descends into the lower portion 80 of sleeve 50 and gradually reduces air flow from inlet 48 into slots 70 until the flow rate is equal to the escape flow rate through the throttling gap 82 established between the lowermost portion of diaphragm 30 and the ground surface 40. Thereafter the flow of air into annular chamber 36 is modulated by axial movement of valve 64 responsive to variation in level of structure 2. Axial movement of valve 64 within a vertical range equal to the vertical dimension of the tapered portion causes a very gradual variation in radial gap between tapered portion 68 and the inside diameter 84 of lower portion 80. By properly selecting the degree of taper for portion 68, metering of air flow in precise relation to load is accomplished. For example, when the sensed load is increased, the supported structure 2 descends simultaneously displacing valve 64 upwardly to enable an increased flow rate capable of providing sufficient pressure within the plenum 36 to support the increased load. Upon reduction in the supported load, the displaced relation of the valve reverses and the flow of air from inlet 48 to chamber 36 is correspondingly diminished by reduction in the aforementioned annular gap so that only an amount of air sufficient to support the lighter load is utilized.

In practice, it is desirable that air be supplied to conduit network 12 at a pressure at least as high as the maximum operating pressure expected to be required within the plenum cavities of the individual air bearings so that the linear displacement of the valve relative to the cylinder may be maintained at a minimum, thus for example where it is calculated that maximum loads to be encountered will require plenum cavity pressures of 2 p.s.i., supply pressure of 10 p.s.i. will enable the valve assembly to accomplish increase and decrease in plenum pressure with relatively slight axial displacement of the valve 64 and thereby maintain a steadier level condition and altitude for the supporting structure.

While but one embodiment of the invention has been shown and described, it will be apparent that other changes and modifications may be made therein. It is, therefore, to be understood that it is not intended to limit the invention to the embodiment shown, but only by the scope of the claims which follow.

What is claimed is:

1. In a ground proximate air bearing device including a load supporting surface having a flexible means disposed thereunder forming a depending annular chamber surrounding and communicating with a ground proximate plenum cavity, means for conducting air into said chamber, and a valve assembly interposed between said conducting means and said chamber including a control portion projecting into said chamber operative responsive to variation in displacement of said platform relative to the portion of said flexible means lying in closest proximity to the ground to regulate the flow of air from said conducting means into said chamber.

2. The structure set forth in claim 1 wherein said valve assembly causes progressive increase in air flow responsive to progressive reduction in displacement between said supporting surface and the ground.

3. In an air bearing device including a rigid support structure and a flexible annulus of curved cross section peripherally attached thereunder forming a chamber surrounding and communicating with a ground proximate plenum cavity, conduit means in said structure communicating with said chamber, air flow regulating valve means associated with said conduit means, and support structure height sensitive control means for said valve means extending into said chamber and engaging a portion of said annulus lying in closest proximity to the ground.

4. In a ground proximate air bearing device including a rigid support structure having a vertically displaceable flexible annulus disposed thereunder surrounding and communicating with a ground proximate plenum cavity, conduit means in said structure communicating with said annulus, air flow regulating valve means associated with said conduit means, and axially displaceable support structure height sensitive control means for said valve means extending vertically into said vertically displaceable annulus and engaging a portion thereof lying in closest proximity to the ground.

5. In a ground proximate air bearing device including a rigid support structure and having a plurality of flexible annuli disposed thereunder each surrounding and communicating with a ground proximate plenum cavity, a fluid conducting network in said structure including conduits arranged in parallel communicating relation with said annuli, air flow regulating valve means associated with each of said conduits, and support structure height sensitive control means for each of said valve means including a probe extending into each of said annuli and engaging a vertically deflectable portion thereof lying in closest proximity to the ground.

References Cited by the Examiner

UNITED STATES PATENTS

| | | | |
|---|---|---|---|
| 2,918,183 | 12/1959 | Petersen et al. | 180—7 |
| 3,040,688 | 6/1962 | Gram | 180—7 |
| 3,161,247 | 12/1964 | Mackie | 180—7 |

BENJAMIN HERSH, *Primary Examiner.*

M. S. SALES, *Assistant Examiner.*